United States Patent
Keeton et al.

(10) Patent No.: US 7,467,333 B2
(45) Date of Patent: Dec. 16, 2008

(54) SYSTEM AND METHOD FOR INTERPOSITION-BASED SELECTIVE SIMULATION OF FAULTS FOR ACCESS REQUESTS TO A DATA STORAGE SYSTEM

(75) Inventors: Kimberly Keeton, San Francisco, CA (US); Arif Merchant, Los Altos, CA (US); John Wilkes, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 533 days.

(21) Appl. No.: 11/218,235

(22) Filed: Sep. 1, 2005

(65) Prior Publication Data

US 2007/0050686 A1     Mar. 1, 2007

(51) Int. Cl.
     *G06F 11/00*     (2006.01)
(52) U.S. Cl. .............................. 714/41; 714/42; 703/21
(58) Field of Classification Search .................... 714/41
See application file for complete search history.

(56) References Cited

U.S. PATENT DOCUMENTS

| | | | |
|---|---|---|---|
| 7,292,969 B1 * | 11/2007 | Aharoni et al. | ............... 703/21 |
| 7,356,452 B1 * | 4/2008 | Naamad et al. | ............... 703/22 |
| 2003/0149919 A1 * | 8/2003 | Greenwald et al. | ............ 714/43 |
| 2004/0254777 A1 * | 12/2004 | Foreman et al. | ............... 703/21 |

OTHER PUBLICATIONS

"HP OpenView Continuous Access Storage Appliance". http://www.hp.com/products1/storage/products/virgualization_appliances/network/sv3000/inde.html; 2 pages Last accessed Feb. 2005.

Anderson, D. et al., "Interposed request routing for scalable network storage". In Proc. 4th OSDI, 2000; 14 pages.

Baldini, A. et al., BOND: An interposition agents based fault injector for Windows NT. In Proc. IEEE Intl. Symp. on Defect and Fault Tolerance in VLSI Systems, pp. 387-395, Oct. 2000.

Brown, A. et al., "Towards availability benchmarks: A case study of software RAID systems". In Proc. of USENIX Tech. Conf., Jun. 2000. 14 pages.

Brown, A. et al., "Undo for operators: Building an undoable e-mail store". In Proc. USENIX Tech. Conf., Jun. 2003.

Carreira, J. et al., Xception: Software fault injection and monitoring in processor functional units. In Proc. 5th IFIP Intl. Working Conf. on Dependable Computing for Critical Applications, Sep. 1995, 14 pages.

(Continued)

*Primary Examiner*—Christopher S McCarthy

(57) ABSTRACT

According to one embodiment, a method comprises intercepting, at an interposition agent, requests for accessing a data storage device. The method further comprises determining, by the interposition agent, at least one of the requests to impact, and selectively simulating, by the interposition agent, a fault for the selected at least one of the requests. According to another embodiment, a system comprises at least one data storage device, and at least one requester operable to request access to the at least one data storage device. The system further comprises at least one interposition agent communicatively interposed between the requestor(s) and the data storage device(s) to intercept requests for access from the requestor(s) to the data storage device(s), wherein the interposition agent is operable to selectively determine ones of the intercepted requests to impact and selectively simulate a fault for the selected at least one of the requests.

45 Claims, 6 Drawing Sheets

OTHER PUBLICATIONS

Kalyanakrishnam, M. et al., "Failure data analysis of a LAN of Windows NT based computers." In Proc. of SRDS, 1999; 10 pages.

Koopman, P. et al., "The exception handling effectiveness of POSIX operating systems". IEEE Trans. on Software Engineering, 26(9): Sep. 2000, pp. 837-848.

Lee, I et al., "Faults, symptoms, and software fault tolerance in the Tandem Guardian90 operating system" In Proc. of FTCS, 1993, pp. 20-29.

Lowell, D. et al., Devirtualizing virtual machines—enabling general, single-node, online maintenance. In Proc. of 11th ASPLOS, Oct. 2004; pp. 211-223.

Lumb, C. et al., "Facada: Virtual storage devices with performance guarantees". In Proc. of USENIX FAST, Apr. 2003; 14 pages.

Nagaraja, K. et al., "Using fault injection and modeling to evaluate the performability of cluster-based services". In Proc. USENIX USITS, Mar. 2003; 14 pages.

Nagaraja, K. et al., "Understanding and dealing with operator mistakes in internet services". In Proc. OSDI, Dec. 2004; 16 pages.

Narasimhan, P. et al., "Using interceptors to enhance CORBA". IEEE Computer, Jul. 1999, pp. 62-68.

Oppenheimer, D. et al., "Why do Internet services fail, and what can be done about it?" In Proc. of USENIX USITS, Mar. 2003; 15 pages.

Rhea, S. et al., "Pond: the OceanStore prototype". In Proc. of USENIX FAST Conf., Mar. 2003; pp. 1-14.

Stott, D. et al., "NFTAPE: A framework for assessing dependability in distributed systems with lightweight fault injectors". In Proc. IPDS, Mar. 2000; 10 pages.

Sullivan, M. et al., "A comparison of software defects in database management systems and operating systems". In Proc. of FTCS, 1992; pagees 475-484.

Swift, M. et al., "Improving the reliability of commodity operating systems", ACM TRans. on Computer Systems, Nov. 2004; 33 pages.

Talagala, N. et al., "An analysis of error behavior in a large storage system", Technical Report UCB/CSD-99-1042, UC Berkeley, Feb. 1999; 18 pages.

Tsai, T. et al., "An approach to benchmarking of fault-tolerant commercial systems", in Proc. of FTCS, 1996, pp. 314-323.

Vieira, M. et al., "Portable faultloads based on operator faults for DBMS dependability benchmarking", In Proc. 28th IEEE Intl. Computer Software and Applications Conf., Sep. 2004; 8 pages.

Zhang, M. et al., "Performability Evaluation of Networked Storage Systems Using N-SPEK" Workshop on Parallel I/O in Cluster Computing and Computation Grids, May 2003, Tokyo, Japan, pp. 736-741.

K. Keeton et al., "A New Perspective on Fault Injection for Large-Scale Information Systems," pp. 1-5 (Date: The inventors indicate that this undated article was privately submitted to the First Workshop on Hot Topics in System Dependability on or around Mar. 2005. The submission was Rejected and therefore was not published. Later, the inventors indicate that another private submission of the undated article was made to the 3rd USENIX Workshop on Real, Large Distributed Systems. This submission was also Rejected, and therefore not published.).

K. Keeton et al., "Understanding the Dependability of Large-Scale Information Systems Using Interposition-Based Fault Injection," pp. 1-5 (Date: Available as a local Technical Report within Hewlett-Packard on or around Feb. 2006. The inventors do not believe this was published externally.).

IEEE First Workshop on Hot Topics in System Dependability, http://dslab.epfl.ch/hotdep/2005, pp. 1-4 (Jun. 30, 2005).

3rd USENIX Workshop on Real, Large Distributed Systems, http://www.usenix.org/event/worlds06, 1 page (Nov. 5, 2006).

* cited by examiner

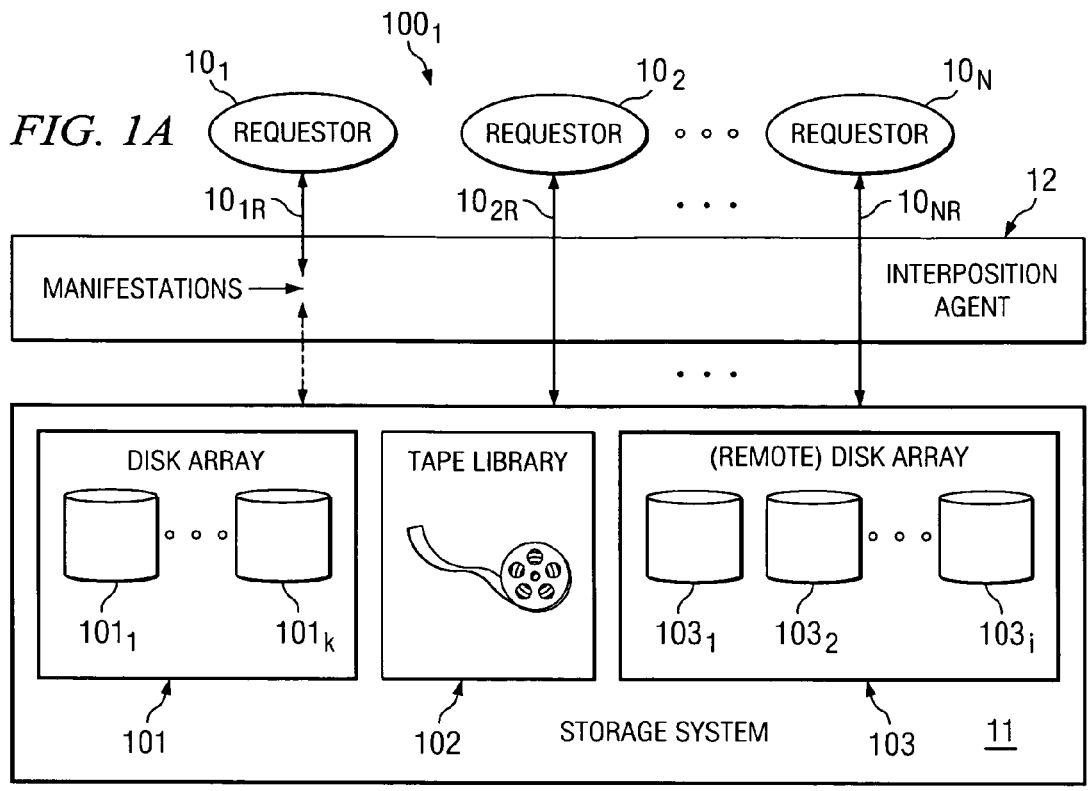
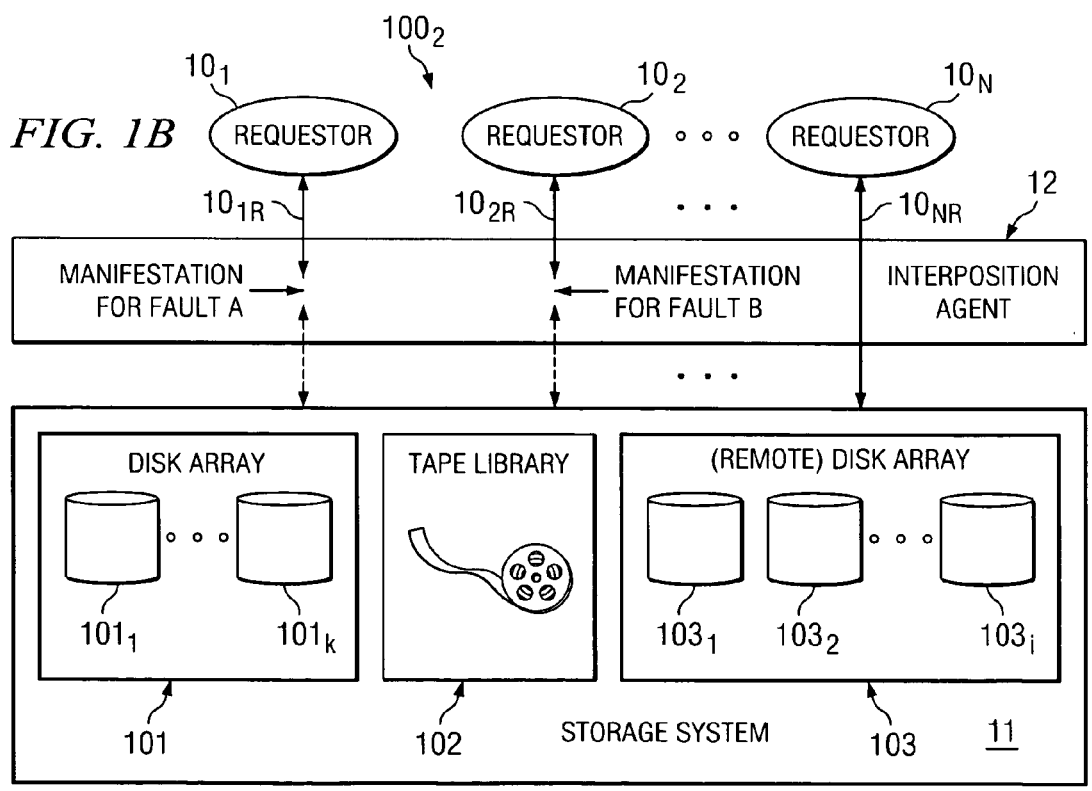

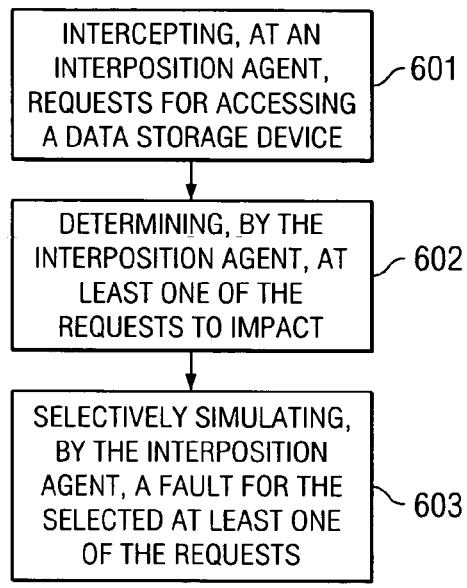
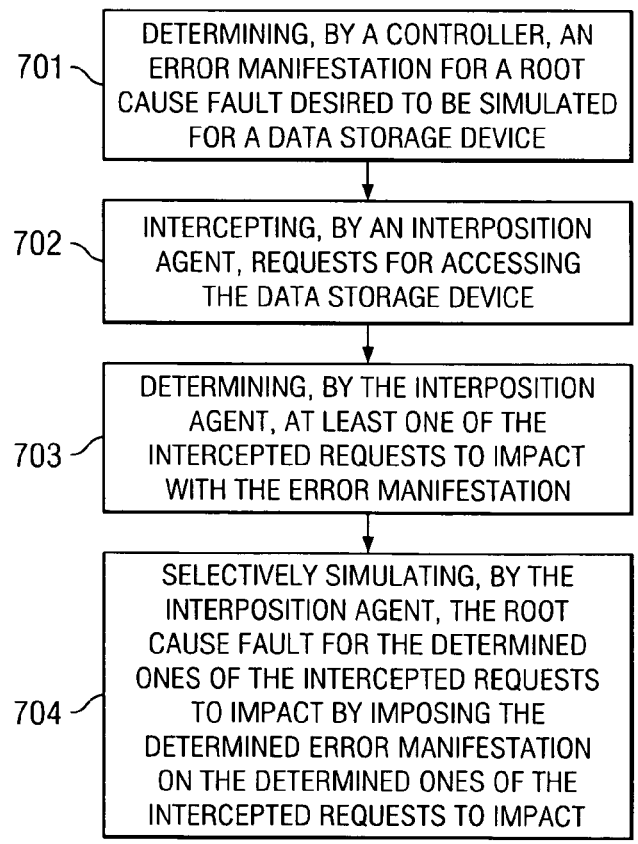

SYSTEM AND METHOD FOR INTERPOSITION-BASED SELECTIVE SIMULATION OF FAULTS FOR ACCESS REQUESTS TO A DATA STORAGE SYSTEM

FIELD OF THE INVENTION

The following description relates in general to injection of faults for a data storage system for evaluation of the effects of such faults (e.g., on processes accessing such data storage system), and more specifically to a system and method for using an interposition agent for selectively simulating faults for access requests to a data storage system.

DESCRIPTION OF RELATED ART

Data storage systems are heavily relied upon today. Vital information of companies, individuals, and/or other entities is commonly stored to data storage systems. Various applications commonly access stored data to present the data to users in a human-readable format and/or otherwise process the data to perform certain tasks. In many cases, the data stored to a data storage system is voluminous. For instance, a given database may require tens or hundreds of disks to store all of its data. The term "data storage system" is used broadly herein to refer to any system operable to maintain a persistent state in storing data, including as examples (and without limitation) a block-level online storage systems (e.g., disk arrays), tape backup systems, file systems, and database management systems.

From time-to-time certain faults may arise in a data storage system, and it is thus desirable to evaluate the impact that such faults may have on processes that rely on the data storage system. Accordingly, it becomes desirable to inject faults into data storage systems in order to evaluate the impact of such faults on requestors (e.g., applications or processes requesting data access). For instance, it may be desirable to evaluate the tolerance of certain applications to faults that result in such manifestations as latencies in data access requests, unavailability of requested data, errors in the data, etc. In this regard, the term "fault" is used broadly herein, and is not limited to errors or failures of the underlying storage device(s) of a data storage system, but instead encompasses any condition that negatively impacts a request for access to the data storage system in some way. Examples of data storage "faults" include, without limitation, data loss, data corruption, storage device failure, and increased accesses to the data storage device (e.g., increased network traffic and/or contention for a given data storage device). Again, such faults may manifest themselves in such ways as increased data access latencies, unavailability of requested data, loss of a portion of requested data (e.g., dropped packets), or errors in the requested data, as examples. By evaluating the tolerance of processes to these faults, strategic decisions can be made regarding, for example, the appropriate environment in which to deploy the processes.

Fault injection has been used in many contexts to facilitate greater understanding of program behavior under hardware and software failures and human errors. However, the persistent storage that forms the basis of information asset repositories is not generally the target of fault injection research. Fault injection is more typically applied to processor instructions, memory contents, and operating system ("OS") system calls. Several studies have injected limited storage failures to evaluate the dependability of software RAID systems, SCSI storage systems, and multi-tier Internet services. These studies explored relatively small-scale disk-based storage systems, but did not address questions of storage failures in the broader context of disk arrays, backups, snapshots, or remote mirroring, as examples.

Various techniques have been proposed for evaluating the impact of faults within a data storage system. One technique involves injecting an actual fault into the actual data storage system to be evaluated. For instance, one might inject a data corruption error into the storage system by intentionally changing the bits of a block on the underlying storage device. This has the benefit of enabling evaluation of the impact to processes of an actual fault encountered by the actual data storage system that the processes rely upon. However, the very feature that provides this benefit leads to certain disadvantages. For instance, because an actual fault is injected into the actual data storage system, care must be taken to ensure that non-recoverable errors are not propagated through the system, thus adding complexity to the implementation. For instance, copy-on-write operations may be performed to keep track of all write operations performed, and/or other steps may be taken to keep track of the operations that may have encountered faulty data in order to later rollback those operations. Of course, this is often not practical in a real-world setting, and so this type of evaluation is typically limited to use in a non-production environment (e.g., limited to use within a testing environment). Further, because an actual fault is injected into the data storage system, the injected fault impacts all processes desiring to access the data storage system (or at least those desiring to access the portion of the data storage system for which the fault is injected). This technique does not permit a fault to selectively impact certain processes (e.g., in order to evaluate the impact of the fault on those selected processes), while allowing other processes to simultaneously be unaffected by such fault. Rather, any process that accesses the portion of the data storage system in which the fault is injected will be impacted by the fault.

An alternative technique has been proposed which does not require injecting an actual fault to an actual data storage system. This alternative technique emulates the data storage system, and thus can be used for emulating such data storage system having faults injected therein. Accordingly, processes may be evaluated by implementing them to access such emulated data storage system, and evaluating the impact of certain faults that are emulated. As an example of this type of technique, the SPEK tool, described by M. Zhang, Q. Yang, and X. He in "Performability Evaluation of Networked Storage Systems Using N-SPEK" (Workshop on Parallel I/O in Cluster Computing and Computation Grids, 12-15 May 2003, Tokyo, Japan) evaluates block-level storage performance in the presence of faults injected by a family of fault injectors. Transient and permanent storage faults are injected using an emulated RAM-based virtual SCSI disk on the storage target. The tool also emulates controller failures by adding unrelated loads to steal CPU and/or memory resources from normal storage controller operations. Network delay and packet loss faults can also be injected.

Such emulation techniques alleviate the burden of having to guard against propagating errors in an actual data storage system. However, this is limited by the accuracy of the emulation of the data storage system. Further, traditional emulation techniques, such as the above-mentioned SPEK tool, use a specialized emulated storage device, which has limited capacity, and thus does not allow the storage system to support large-scale applications, such as databases, which often require storage systems comprised of tens or hundreds of disks. Additionally, such emulation tools present the same interface to all clients, rather than permitting selective injection of failures for some clients while preserving normal behavior for others.

Interpositioning is a technique that has traditionally been used for virtualizing storage resources, enforcing storage quality of service requirements, providing fault tolerance, extending interface functionality and permitting monitoring and tracing. Interpositioning has been used for fault injection at the Windows system call boundary, to test application responses to simulated operating system errors. Additionally, Security Innovation's Holodeck™ product simulates faults by interposing on Windows, .Net, and API calls made by application programs. It is intended mainly for testing application functional correctness, robustness, and security on Windows platforms. It can simulate a variety of failures across these system call boundaries, including file corruption, limits on logical resources (e.g., processes, libraries, files, registry keys), network faults, and limits on physical resources (e.g., disk, memory or network bandwidth). It also provides monitoring and logging of system and API calls. The tool does not, however, isolate applications under test by selectively simulating failures to a shared storage device, nor does it address interpositioning between different data protection techniques.

BRIEF DESCRIPTION OF THE DRAWINGS

FIGS. 1A-1B show logical block diagrams of exemplary systems according to an embodiment of the present invention;

FIG. 6 shows an operational flow diagram of one embodiment of the present invention; and FIG. 7 shows an operational flow diagram of another embodiment of the present invention.

DETAILED DESCRIPTION

Figure 2:
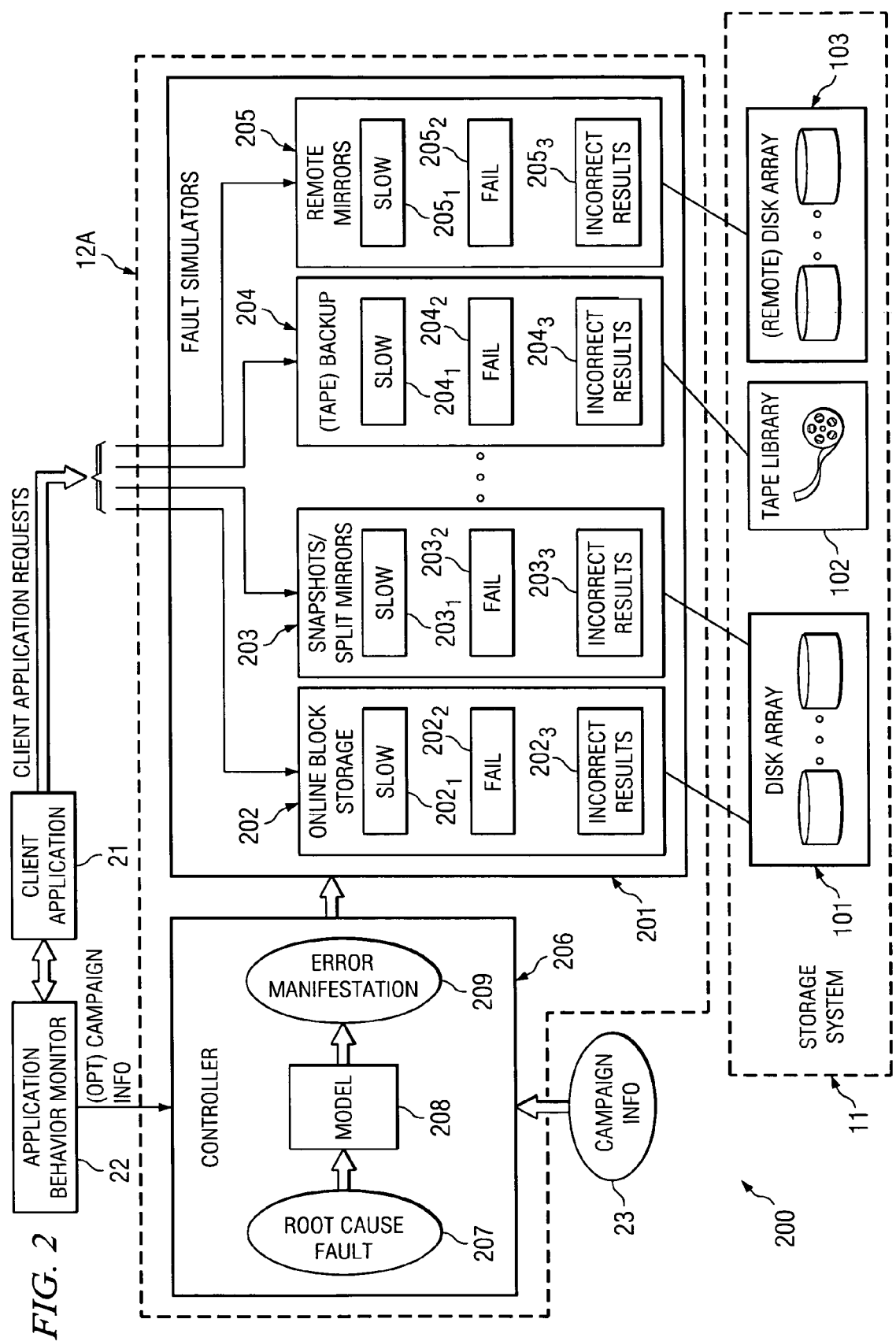
FIG. 2 shows a block diagram of an exemplary implementation of a system according to one embodiment of the present invention.

As described further herein, certain embodiments of the present invention employ interpositioning to enable selective simulation of faults for access requests to a data storage system. Thus, faults can be simulated for certain selected access requests, without impacting other access requests. As described further herein, an interposition agent is implemented in certain embodiments, which can be arranged in any of a number of different ways so as to intercept requests from "requesters" (e.g., operating system, processes, applications, devices, etc.) desiring to access data from a data storage system. For instance, in certain embodiments the interposition agent is interposed between an operating system and data storage device(s). The interposition agent may be implemented in a manner that is transparent to the requestors and data storage device(s), and thus the requestors and data storage device(s) need not be modified for implementing certain embodiments of the present invention. Thus, in certain embodiments, the actual underlying data storage system is not modified, but instead a return (or response) that would be encountered by a particular requestor in the event that some fault was encountered is simulated by an interposition agent. In certain embodiments, an interposition agent may already be present in the system (i.e., the system may typically include an interposition agent therein), and such interposition agent is adapted to employ the techniques described further herein for simulating faults for impacting selected data storage access requests.

In certain embodiments, the interposition agent can be programmatically configured to select one or more desired types of faults to be simulated for one or more portions (e.g., storage devices) of a data storage system. Further, the interposition agent can be programmatically configured to select one or more access requests (e.g., streams of requests from a specified process, client, etc.) to impact with the simulated fault(s) desired. Accordingly, certain embodiments advantageously enable faults for an actual data storage system to be simulated for actual requesters (e.g., processes, applications, etc.) desiring to access such data storage system in a runtime, production environment without requiring that the faults impact all requestors executing in such environment. Of course, while certain embodiments described herein are particularly suited for use in an actual runtime, production environment, the techniques may be likewise employed in a non-production (e.g., test) environment if so desired. Further, the techniques described herein can be applied to many different parts of a data storage system. For instance, the techniques described are not limited in application to just online copies of the data storage, but can also be applied to backup copies and other copies that are made of the dataset in order to protect against failures. As discussed further below, interpositioning to impose simulated storage failures can be at different geographic scopes (e.g., between two local replicas or between a local replica and a remote replica) or between different data protection techniques (e.g., between a disk array that performs snapshots and a tape backup system), in accordance with embodiments of the present invention.

In certain embodiments, a mapping between faults and manifestations of such faults is provided by a failure model, which a controller can use to determine the appropriate manifestation to be used by the interposition agent in impacting selected requests in order to properly simulate a desired fault. For instance, a "fault" may be high contention for a given data storage device (or high network traffic across which the data storage device is accessed), and the manifestation of such fault may be an increased latency in responding to access requests and/or dropped packets of a response to an access request. Many different faults can actually map onto the same kind of manifestation observable by a requestor (e.g., application). For example, a response to a data access request might be slow either because there are SCSI timeouts occurring in the data storage system, because the drives have been taken offline due to thermal recalibration, because there is an inefficiency in the way that the data is laid out, because there is contention for the storage device, etc. Thus, all of these different faults might potentially map onto the same observable behavior from the requestor's perspective. According to certain embodiments of the present invention, the interposition agent simulates the error manifestations for a desired fault (or "root cause"), rather than actually injecting the fault into the data storage system.

Certain embodiments include a model for translating hardware-induced, software-induced, and/or human error-induced faults into the client-visible manifestations of the errors. For instance, a SCSI timeout, a power failure, a firmware bug or an intermittent offline period (e.g., for thermal recalibration) all may cause a block-level request failure.

According to one embodiment, a model is used to thus cause an interposition agent to inject a block-level request failure to simulate one of these faults. Previous approaches to storage fault injection have focused on the root cause faults, which may or may not manifest themselves to the client application.

Thus, as described further below, in certain embodiments a controller determines, from a failure model, an error manifestation for a root cause fault desired to be simulated for a data storage device. The interposition agent intercepts requests for accessing the data storage device, and determines at least one of the intercepted requests to impact with the error manifestation. The interposition agent thus selectively simulates the fault for the determined ones of the intercepted requests to impact by imposing the determined error manifestation on the determined ones of the intercepted requests to impact.

In certain embodiments of the present invention, one or more fault "campaigns" may be defined. Such a campaign may specify a number of faults that are to be simulated, as well as various other characteristics desired for evaluation of a system, such as identification of the requests that a given fault is to impact, duration of the simulation of a given fault, frequency of occurrence of a given fault in the duration of the simulation, etc. In certain embodiments, separate fault campaigns are defined for different requesters. In certain embodiments, a number of fault campaigns may be defined, and one or more of such fault campaigns may be active at any given time. Thus, for instance, a first fault campaign may be defined for specifying a number of faults and corresponding durations, frequencies, etc. of such faults to be employed for impacting requests from a first requestor, while a different fault campaign may be defined for specifying a number of faults and corresponding durations, frequencies, etc. of such faults to be employed for impacting requests from a second requestor. As described further herein, in certain embodiments, fault campaign(s) may be defined programmatically by inputting campaign information to a controller, which in turn controls the operation of an interposition agent to cause it to simulate fault(s) in accordance with the defined fault campaign(s). While many examples provided herein focus on the simulation of a given fault, it should be understood that in certain embodiments fault campaign(s) may be defined, which may configure the interposition agent to simulate a plurality of different faults for various different requesters and/or according to different durations and/or frequencies, etc.

Embodiments of the present invention are suitable for use in large-scale data storage environments. Evaluating the dependability of enterprise-scale persistent storage systems, for example, is challenging due to their distributed, wide-area nature and multi-component architecture, as well as the presence of a multi-layer storage stack. As a result, it becomes desirable to evaluate dependability at many different layers and scopes. These storage systems are often used to support multiple applications simultaneously. Thus, although standalone application testing is a natural starting point, it is often ultimately desirable to run tests in the shared environment to fully understand system behavior.

Certain embodiments of the present invention provide a framework for injecting simulated storage-related faults in realistic environments, such as large-scale data storage environments (e.g., enterprise-scale persistent storage systems or other distributed storage systems). This framework uses the concept of interpositioning, where interposition agents are placed at the interface between system components to capture (and potentially modify) events crossing that interface boundary. Interpositioning has traditionally been used for virtualizing storage resources, enforcing storage quality of service requirements, providing fault tolerance, extending interface functionality and permitting monitoring and tracing. Embodiments of the present invention illustrate how interpositioning can also be effectively used to inject events to simulate the faults of storage subsystem components.

Turning to FIGS. 1A-1B, logical block diagrams of exemplary systems $100_1$ and $100_2$ according to an embodiment of the present invention are shown. Systems $100_1$ and $100_2$ each comprises a data storage system 11, which may include various data storage devices such as disk array 101 having disks $101_1, \ldots, 101_k$, tape library 102 (which may comprise a plurality of tape libraries, each with a plurality of tapes and tape drives), and remote disk array 103 having disks $103_1, 103_2, \ldots, 103_i$, where k and i may be any numbers. While storage system 11 illustrates one exemplary implementation of a storage system, embodiments of the present invention are not limited in application to this (or any other) specific storage system. For instance, in a given embodiment, storage system 11 may include other data storage devices in addition to or instead of those specifically shown in FIG. 1A. Various requesters $10_1, 10_2, \ldots, 10_N$ (collectively referred to as requesters 10) are also included in systems $100_1$ and $100_2$, which are requesting data from data storage system 11 via request streams $10_{1R}, 10_{2R}, \ldots, 10_{NR}$, respectively, where N may be any number. Requestors 10 may be any type of entity that requests access (e.g., read and/or write access) to data in data storage system 11, including without limitation operating system(s), processes, applications, clients, devices, etc. Further, systems $100_1$ and $100_2$ include interposition agent 12 through which requests for access to data storage system 11 flow. Interposition agent 12 may, in certain implementations, be transparent to requestors 10 and/or data storage system 11. Various exemplary techniques for implementing such an interposition agent 12 within a system for intercepting data access requests are described further herein.

In operation of the example of FIG. 1A, requestors $10_1$ through $10_N$ are making data access requests to data storage system 11, which flow through interposition agent 12. Interposition agent 12 may be configured to selectively impact any of those data access streams $10_{1R}$-$10_{NR}$ by simulating a desired type of fault in the data storage system 11. In this example, interposition agent 12 is configured to simulate a fault for the requests of stream $10_{1R}$ from requestor $10_1$. Exemplary techniques for programmatically configuring interposition agent 12 to select a desired request stream to impact and/or a desired type of fault to simulate for impacting the selected request streams are described further herein. As illustrated in the example of FIG. 1A, interposition agent 12 selectively impacts request stream $10_{1R}$ by simulating a desired type of data storage fault, while passing the request streams $10_{2R}$-$10_{NR}$ without impact to data storage system 11. As described further herein, in certain embodiments interposition agent 12 simulates a desired type of data storage fault by manifesting a resulting type of "error" (e.g., increased latency in responding, dropping all or a portion of the requested data from the response, responding with corrupt data, responding with an indication of an error, etc.) in response to the data access requests of the impacted stream $10_{1R}$. Depending on the type of fault being simulated, the interposition agent 12 may, in response to a data access request of stream $10_{1R}$, access (e.g., write to or retrieve from) the requested data of data storage system 11 (as indicated by the dashed line of FIG. 1A for stream $10_{1R}$). However, interposition agent 12 may simulate to the requestor $10_1$, that such data access is impacted in some way, such as delayed by some amount of latency, etc.

In operation of the example of FIG. 1B, requestors $10_1$ through $10_N$ are again making data access requests to data storage system 11, which flow through interposition agent 12. In this example, interposition agent 12 is configured to simulate a fault of type A for the requests of stream $10_{1R}$ from requestor $10_1$, and interposition agent 12 is configured to simulate a fault of type B for the requests of stream $10_{2R}$ from requester $10_2$. That is, in this example interposition agent 12 is configured to simultaneously simulate different types of faults for different data access streams. According to certain embodiments, various faults may be defined as part of a fault "campaign," as described further herein. Exemplary techniques for programmatically configuring interposition agent 12 to select desired request stream(s) to impact and/or a desired type of fault to simulate for impacting the selected request streams are described further herein. As illustrated in the example of FIG. 1B, interposition agent 12 selectively impacts request stream $10_{1R}$ by simulating a data storage fault of type A, and interposition agent 12 selectively impacts request stream $10_{2R}$ by simulating a data storage fault of type B. For example, fault A may be a type of fault (e.g., contention for the storage device, etc.) that manifests high latency for responding to the data access request, while fault B may be a type of fault (e.g., failed storage device) that manifests no response or an error response to a data access request. Accordingly, requestors $10_1$ and $10_2$ can be simultaneously evaluated for their tolerance to different types of data storage fault conditions. The remainder of the request streams, including request stream $10_{NR}$, are passed through by interposition agent 12 without impact to data storage system 11.

In view of the above, in certain embodiments an interposition agent (e.g., proxy) is inserted into the normal request execution path to intercept requests, and provide responses that simulate fault manifestations (e.g., slowdowns). In certain embodiments, the agent includes a model for translating hardware-induced, software-induced, and/or human error-induced faults into the manifestations observed by a requestor (e.g., process or application). Sample fault manifestations include request failure (e.g., for read or write requests), request slowdown (e.g., performance faults for read or write requests), and incorrect responses (lost or corrupted data for read requests). For instance, if one controller in a typical dual-controller array fails, the most significant impact is typically an increase in write latency, since the array stops using write-back caching. An interposition agent of an embodiment of the present invention can simulate the impact of such a failure on an application using a particular volume by having the device driver agent artificially slow all writes to that volume.

In general, interpositioning means that faults (even data loss or corruption errors) can be simulated, without actually affecting the underlying state of the persistent store. Careful interposition of agents allows the isolation of individual applications, even though the underlying infrastructure may be shared with other applications. For instance, testing the failure resiliency of a new application server in a multi-tier environment, while isolating other applications that use the same underlying database tier, is enabled by interposing on only those requests from the newly introduced application.

This technique can be applied at the interface for different data protection techniques. For instance, in certain embodiments a device driver (as discussed below) may be modified to interpose on the interface to the primary copy of the data stored on a local disk array, as well as the interface to any snapshots that may have been taken on the local array. In certain embodiments, a backup server may be modified to interpose on the interface to the backup system. A standalone storage virtualization engine, such as the CASA™ product available from Hewlett-Packard Company, may be modified to simulate inter-array mirroring failures. Thus, interpositioning also permits simulation of remote failure events. The interfaces between different layers of the storage stack can also be interposed (e.g., a virtual file system wrapper to simulate failures in a network file system or a database wrapper to simulate database faults in a multi-tier environment).

Various techniques now known or later developed for inserting an interposition agent into a system may be employed for implementing an interposition agent that is capable of intercepting data access requests in accordance with embodiments of the present invention. Preferably, such interposition agent is implemented transparent to the remainder of the system. For instance, an interposition agent may be configured to masquerade as having the same address as a data storage device, wherein it appears to requesters that the address of the interposition agent is the address of the data storage device. Thus, when the requesters direct data accesses to the data storage device, they are in fact sent to the interposition agent. In some systems, an interposition agent may already be implemented, as with the above-mentioned CASA system, wherein the existing interposition agent may be adapted to act as described herein.

Turning to FIG. 2, a block diagram of an exemplary implementation of a system 200 according to one embodiment of the present invention is shown. As in systems $100_1$ and $100_2$ of FIGS. 1A-1B, system 200 includes data storage system 11. System 200 further includes an exemplary embodiment of interposition agent 12, shown as interposition agent 12A. In this example, interposition agent 12A includes controller 206 and fault simulators 201. Of course, in other embodiments controller 206 and/or fault simulators 201 may be separate component(s) that is/are communicatively coupled to interposition agent 12A, rather than being integrated within interposition agent 12A.

In this example, system 200 includes client application 21 that makes data access requests to data storage system 11, wherein such requests flow through interposition agent 12A. Thus, client application 21 is one example of a "requester." System 200 further includes an application behavior monitor 22, which monitors the behavior of application 21 when encountering certain data storage faults simulated by interposition agent 12A. In certain embodiments, application behavior monitor 22 may be included as part of interposition agent 12A.

In this exemplary implementation of controller 206, it includes model 208 that maps between root cause faults 207 and respective error manifestations 209. Thus, for instance, model 208 may be a data structure that maps such root cause faults as contention for a data storage device, high network traffic, and disk array mirrored controller failure to high response latency as an error manifestation of those root cause faults. Model 208 may also map such root cause faults as a failed data storage device and accidental deletion of the data to no data response (or an error indicating failure in response to the requested data) as an error manifestation of those root-cause faults. As still a further example, model 208 may map such root cause faults as accidental or malicious data corruption or degradation of the storage medium to incorrect data as an error manifestation of those root cause faults. It should be understood that model 208 may be any suitable data structure for mapping between root cause faults and their respective error manifestations. In certain embodiments, a model 208 may be downloaded to controller 206 to update various root cause faults and their respective error manifestations as desired.

This exemplary implementation of fault simulators 201 includes a fault simulator 202 for online block storage, fault simulator 203 for snapshots/split mirror storage, fault simulator 204 for backup (e.g., tape) storage, and fault simulator 205 for remote mirror storage. Other fault simulators for other types of data storage devices may be included in addition to or instead of simulators 202-205 in other embodiments. Fault simulator 202 includes logic (e.g., software code) for simulating various error manifestations for online block storage, such as simulating slow responses (latency) via logic $202_1$, failed responses via logic $202_2$, and incorrect results via logic $202_3$. Thus, simulator 202 is operable to impose any of various desired error manifestations for access requests made by client application 21 to online block storage (e.g., disk array 101) to simulate a desired root cause fault for such online block storage.

Similarly, fault simulator 203 includes logic (e.g., software code) for simulating various error manifestations for snapshots/split mirror storage, such as simulating slow responses (latency) via logic $203_1$, failed responses via logic $203_2$, and incorrect results via logic $203_3$. Thus, simulator 203 is operable to impose any of various desired error manifestations for access requests made by client application 21 to snapshots/split mirror storage (e.g., disk array 101) to simulate a desired root cause fault for such storage.

Similarly, fault simulator 204 includes logic (e.g., software code) for simulating various error manifestations for backup storage, such as simulating slow responses (latency) via logic $204_1$, failed responses via logic $204_2$, and incorrect results via logic $204_3$. Thus, simulator 204 is operable to impose any of various desired error manifestations for access requests made by client application 21 to backup storage (e.g., tape library 102) to simulate a desired root cause fault for such storage.

Likewise, fault simulator 205 includes logic (e.g., software code) for simulating various error manifestations for remote mirror storage, such as simulating slow responses (latency) via logic $205_1$, failed responses via logic $205_2$, and incorrect results via logic $205_3$. Thus, simulator 205 is operable to impose any of various desired error manifestations for access requests made by client application 21 to remote mirror storage (e.g., remote disk array 103) to simulate a desired root cause fault for such storage. Of course, other types of remote storage may be present in a given system in addition to or instead of the exemplary remote storage shown in FIG. 2, such as wide area erasure coded storage systems, and embodiments of the present invention may be likewise employed for simulating faults for selected requests to any such remote storage system.

In certain embodiments, simulation logic may be added (e.g., downloaded) to one or more of the simulators 202-205 to update such simulators with the ability to take actions for imposing various error manifestations in addition to or instead of those error manifestations supported by exemplary logic (e.g., slow, fail, and incorrect results) implemented in FIG. 2. Thus, if an error manifestation other than those supported by the exemplary logic described above for simulators 202-205 is desired to be supported for one or more of the types of data storage of data storage system 11, logic implementing such error manifestation may be added to the corresponding simulators.

In operation of this exemplary embodiment, campaign information 23 is input to controller 206. Such campaign information 23 may be input by a user, by application behavior monitor 22, or by any other application, as examples. Campaign information 23 specifies information regarding the type of fault(s) desired to be simulated and/or identifying requests for which such fault(s) is/are to be simulated by interposition agent 12A. Campaign information 23 may, for example, include such information as type(s) of root cause fault(s) to be simulated, frequency of each fault type, duration of failure persistence, scope of simulated failure (e.g., the storage devices to have or be affected by such failure), and/or targeted requests desired to be impacted by such fault(s) (e.g., those requests from client application 21).

Thus, in certain embodiments, campaign information 23 defines a "fault campaign" to be employed for impacting certain requests of a system. The fault campaign may be programmatically defined (by campaign information 23) to include multiple error manifestations and/or root cause faults to be simulated for one or more selected requests (e.g., requests from client application 21 and/or other requestors). In certain embodiments, separate fault campaigns are defined for different requesters (e.g., different applications). That is, in certain embodiments a number of fault campaigns may be defined (e.g., via campaign information 23), and one or more of such fault campaigns may be active (i.e., having their respective faults simulated by interposition agent 12A) at any given time. Thus, for instance, a first fault campaign may be defined via campaign information 23 for specifying a number of faults and corresponding durations, frequencies, etc. of such faults to be employed for impacting requests from client application 21, while a different fault campaign may be defined via campaign information 23 for specifying a number of faults and corresponding durations, frequencies, etc. of such faults to be employed for impacting requests from another requestor (e.g., another client application).

In certain embodiments, application behavior monitor 22 may monitor the targeted application (e.g., client application 21) and dynamically supply new campaign information to controller 206 to adjust the manner in which requests from the targeted application are impacted. For instance, application behavior monitor 22 may, based on its evaluation of client application 21's ability to tolerate various root cause faults being simulated by interposition agent 12A, input new campaign information 23 to controller 206 to stop or modify the campaign in some way.

Based on the received campaign information 23, controller 206 determines a root cause fault 207 that is desired to be simulated. Controller 206 then uses model 208 to map the desired root cause fault 207 to a corresponding error manifestation 209. In certain embodiments, the campaign information 23 may specify a desired error manifestation, rather than a desired root cause fault, in which case such mapping from a root cause fault to an error manifestation via model 208 is omitted.

Controller 206 also determines from the received campaign information 23, for which storage device(s) the desired fault is to be simulated. That is, the controller 206 determines the scope of the simulated fault. In certain embodiments, the campaign information 23 specifies which types of storage (e.g., online storage, backup storage, etc.) the interposition agent 12A is to simulate as having the desired root cause fault.

Controller 206 also determines from the received campaign information 23, which requests are to be impacted with the desired simulated fault. For instance, campaign information 23 may specify that interposition agent 12A is to impact all requests from client application 21 with the desired simulated fault. The interposition agent 12A then monitors the intercepted data access requests to determine if any of the requests are ones that are to be impacted. That is, the interposition agent 12A determines whether the requests are ones specified as requests to be impacted (e.g., from client application 21) and whether such requests are directed to a data storage type for which a fault is to be simulated. When any such request is detected by interposition agent 12A, it uses the appropriate simulator 202-205 to impose the error manifestation 209 on such request, thereby simulating the desired root cause fault 207.

For example, suppose campaign information 23 specifies that a root cause fault of high contention for online block storage is desired to be imposed on all data access requests from client application 21 that are directed to such online block storage. Controller 206 receives the campaign information 23 and uses model 208 to map the high contention fault (i.e., root cause fault 207 in this example) to high latency (i.e., error manifestation 209 in this example). Interposition agent 12A then monitors the intercepted requests to detect requests from client application 21 directed to online block storage. Upon detecting such a request, interposition agent uses logic $202_1$ of simulator 202 to impose the appropriate amount of delay to a response to such request, thereby simulating the desired high contention fault for online block storage. For instance, to impose the high latency error manifestation in responding to an access request from client application 21 directed to online block storage, logic $202_1$ may start a timer and delay the response for the request by a determined amount of time. Of course, requests made by other applications and/or requests from application 21 to other parts of the data storage system 11 are not impacted by interposition agent 12A unless a campaign is further established for such other applications and/or other parts of the data storage system.

According to embodiments of the present invention, various aspects of the interposition agent are dynamically programmable, such as which fault(s) to inject, for which request(s) such fault(s) are to be injected, and duration of the injected fault(s). For example, in certain embodiments, the decision of whether to simulate a fault for a given request can be governed by a tunable parameter on fault likelihood. Similarly, the choice of which fault to insert can be governed by a tunable parameter on the relative frequency of different faults. Such tunable parameter can be defined in a given fault campaign via campaign information 23, for example.

In many instances, when an evaluator is interested in persistent state loss and corruption errors, the client application's response to the injected fault manifestation may be evaluated along several dimensions, including performability (e.g., variation in normal-mode application performance due to the fault), application correctness and application data loss. The exact metrics for each of these dimensions will be dictated by the choice of application.

Many types of storage faults may be simulated in embodiments of the present invention, including without limitation:
  a) performance faults: slowdowns or high variability in satisfying requests, to simulate failures of certain hardware components or heavy load on the storage device;
  b) request faults: unsuccessful completion of storage requests, to simulate failure or inaccessibility of hardware components, incorrect operation of software components, security failures (e.g., access permission failures), etc.; and
  c) incorrect results: incorrect data is returned to simulate data loss or corruption (e.g., due to silent data corruption or bit rot).

As discussed above, in certain embodiments, the interposition agent may be programmed via supplied campaign information as to which type of storage fault to inject for selected requests.

In certain embodiments, these injected faults may persist for any of various different time periods. For instance, in certain embodiments, the interposition agent may be programmed via supplied campaign information as to the time period (duration) of an injected fault, including without limitation:
  a) short-term transient: faults whose duration is short, and can be remedied by having the storage client retry the request, without incurring application timeouts or requiring explicit recovery actions (e.g., intermittent connectivity problems for storage interconnect);
  b) long-term transient: longer-duration faults that require explicit (and potentially manual) recovery actions (e.g., replacement of hardware component, software-controlled data recovery/reconstruction). Client retries after the recovery action(s) have been completed may produce correct results; and
  c) persistent: faults that cannot be remedied by retries by the storage client, regardless of the number of retries or recovery actions (e.g., a bad disk block whose contents cannot be overwritten)

The scope of the simulated faults may vary, such as:
  a) storage component faults: a fault may be simulated for a single storage component (e.g., a tape drive in a library or a disk array controller);
  b) correlated storage faults: the same fault may be simultaneously simulated for multiple storage devices (e.g., disk arrays); and
  c) correlated system component faults: if interpositioning is also used to inject simulated faults into other system components (e.g., the memory system), the different interposition agents may cooperate to simulate failures that are correlated across different system components (e.g., a memory corruption fault could cause bad data to be "written" to the storage system). In certain embodiments, the interposition agent may be programmed via supplied campaign information as to the scope of the simulated fault(s) to be injected.

According to certain embodiments, the simulated fault workload may be parameterized using a variety of guidelines. Exemplary guidelines that may be employed for parameterizing the simulated fault workload include, without limitation:
  a) storage client access patterns: fault types and frequencies may be based on application behavior, such as access type or load. For instance, data that is written more often may be more likely to be corrupt when it is read, as compared to infrequently written data;
  b) data structure differentiation: faults to different storage client data structures may be parameterized differently. For instance, file system inodes might experience different loss or corruption characteristics as compared with data blocks or supernode blocks. Accesses to one type of data structure might propagate errors to other data structures (e.g., an updated file inode might experience data block corruption). Similar statements can be made about database data structures (e.g., system catalogs, base tables, indexes, materialized views, temp space);
  c) targeted fraction of visible errors: the interposition agent may choose failure frequencies based on a goal for what fraction of requests results in a visible error. Target fractions might be chosen for the overall error rate, the error rate per gigabyte ("GB") of storage, the error rate for specific data structures, or the rate of specific error classes (e.g., slowdown vs. failure vs. incorrect results or short-term transient vs. long-term transient vs. persistent); and
  d) external application control of fault injection: an application external to the fault injection infrastructure may control the injection campaign, to achieve an observable level of application behavior (e.g., application failure, fault tolerance or adaptation) or to apply a catalog of faults.

In certain embodiments, a user can program the above parameters for the interposition agent to use for a given campaign. Thus, for instance, these parameters may be specified along with (or as part of) campaign information 23.

One question in the design of a fault injection experimental study is the choice of fault, or perturbation, load. The role of humans in the storage system recovery process implies that traditional approaches for injecting a large number of randomly chosen faults become impractical. Instead, in many cases, the fault load should be carefully chosen to represent the most likely and most dangerous cases. Fortunately, domain expertise can be used to guide the prioritization of failure classes. For instance, since data loss or corruption for different types of data will provoke different application responses (e.g., continued correct operation vs. incorrect results vs. crashes), it is useful to distinguish whether loss and corruption faults are injected into system metadata vs. application metadata vs. application critical data vs. application non-critical data.

Table 1 presents an exemplary taxonomy of errors to inject at various points of the storage system.

TABLE 1

Storage system error classes.

| Error manifestation | Injection point | Example simulated faults |
|---|---|---|
| Request failure | Disk array device driver | SCSI timeout, power failure, firmware bug, intermittent offline period (e.g., for thermal recalibration) |
| Read slowdown | Disk array device driver | Disk array cache failure or contention |
| Write slowdown | Disk array device driver | Disk array mirrored controller failure |
| Read returns incorrect results | Disk array device driver | Malicious or accidental data corruption or deletion |
| Snapshot creation failure | Snapshot interface | Snapshot system out of space |
| Snapshot restore failure | Snapshot interface | Malicious or accidental data deletion, snapshot retention period expiration |
| Recovery request failure | Backup system | Failure of backup creation process, tape media or tape drive malicious or accidental backup deletion |
| Backup creation request failure | Backup system | Backup takes longer than allotted window, failure of tape media or drive, backup process misconfiguration |
| Write failure | Remote storage interface | Network link fails and severs communication to remote site |
| Logical volume creation failure | Logical volume manager interface | Out of space, LV misconfiguration |
| Request slowdown | File system interface | File system misconfiguration, slowdown due to file system aging |
| Read returns incorrect results | File system interface | Malicious or accidental file system data corruption or deletion |
| Request failure | File system interface | Malicious or accidental file system metadata corruption or deletion |
| Request slowdown | Database interface | DBMS server overload, storage misconfiguration |
| Read returns incorrect results | Database interface | Malicious or accidental DBMS data corruption or deletion |
| Request failure | Database interface | Malicious or accidental DBMS log or system catalog corruption or deletion |

Thus, table 1 above provides an exemplary mapping between root cause faults and corresponding error manifestation, which may be used as model 208 of FIG. 2. Of course, table 1 is intended merely as an example, and such table may differ in other embodiments and/or evolve over time.

As described above, one approach is to inject error manifestations, rather than faults (which may or may not manifest themselves). According to one embodiment, errors are chosen to be injected that permit evaluation along several different dimensions, including availability, performability, and reliability (including both loss and corruption).

The inspiration for the chosen errors comes from hardware and software failures, configuration and management errors, user/operator errors (e.g., deletion, overwrite) and malicious attacks (e.g., intentional corruption). Several studies have analyzed hardware and software failures and user and operator errors in Tandem systems, IBM's MVS and DB2, Windows operating systems, large-scale storage servers, and large-scale Internet services. Several more recent studies focus explicitly on administrator errors for Internet services and databases. Any desired error manifestations that may be selected for use evaluating a given system and/or requestor may be simulated using the techniques described herein.

Interposition agent 12 of FIGS. 1A-1B and 12A of FIG. 2 may be interposed in any suitable manner within a system for intercepted data access requests. As an example, an interposition agent can be applied at the interface for different data protection techniques (e.g., snapshots, backup, remote replication). In one embodiment of the invention, a device that is physically separate from the client application host or the storage device(s) is used for implementing the interposition agent(s) of a system. However, in other embodiments, the functionality of the interposition agent(s) is included at the host or at a storage device.

Figure 3:
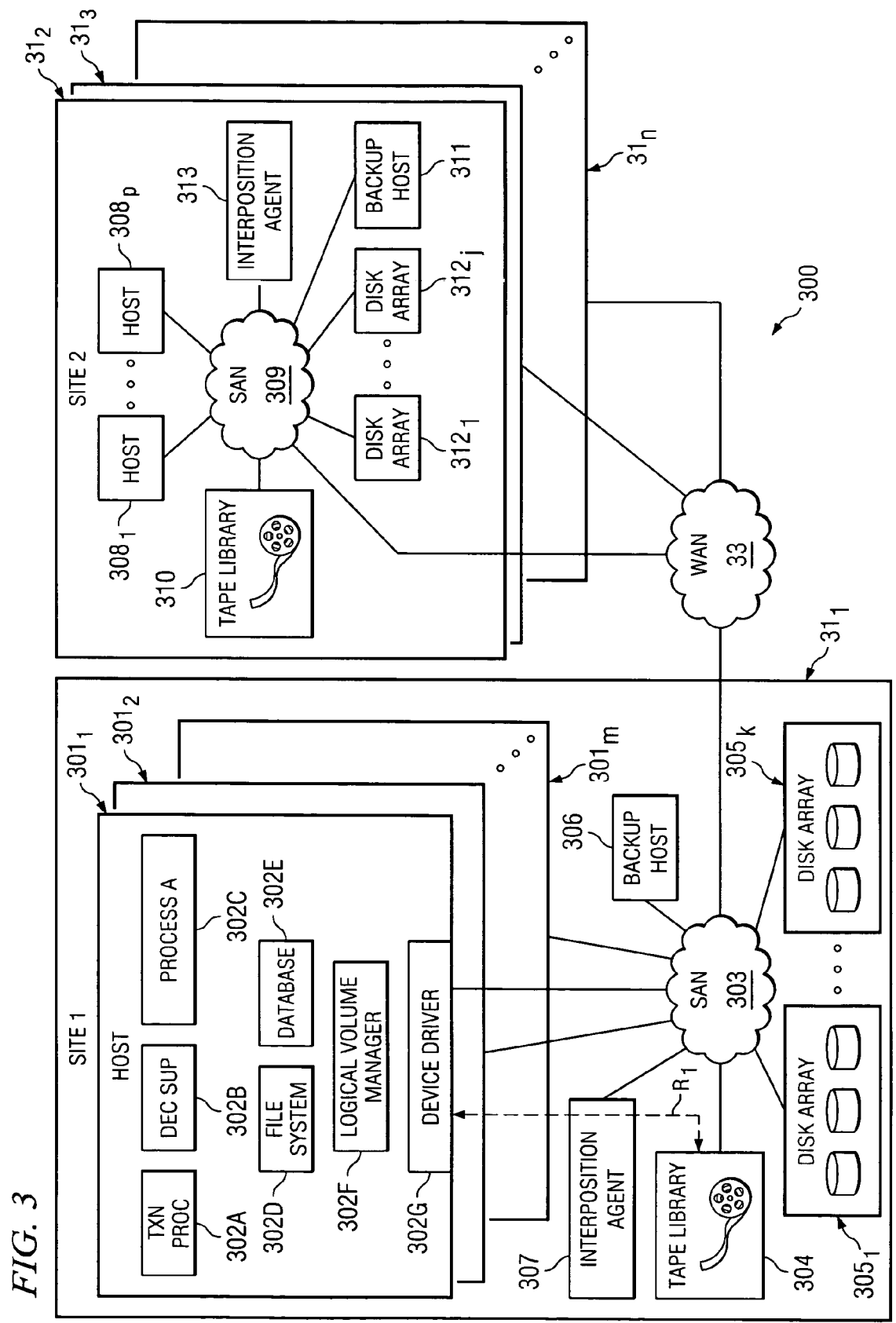
FIG. 3 shows an exemplary system having interposition agents interposed therein in accordance with one embodiment of the present invention.

FIG. 3 shows an exemplary system 300 having such interposition agents interposed therein according to one embodiment of the present invention. System 300 comprises multiple sites $31_1$, $31_2$, $31_3$, ..., $31_n$, wherein n is any number. Each site may include one or more hosts, such as hosts $301_1$, $301_2$, ..., $301_m$ on site $31_1$, and hosts $308_1$, ..., $308_p$ on site $31_2$, wherein m and p are each any number. Each host may include a software stack that may comprise, for example, a device driver 302G, a logical volume manager 302F, a file system 302D, database 302E, and processes (e.g., applications), such as processes 302A-302C. The illustrated exemplary host $301_1$ includes transaction processing database 302A, decision support database 302B, and then some other application (process A) 302C that is running on that host.

Additionally, each site comprises data storage resources. For instance, site $31_1$, comprises tape library 304 (which may comprise a plurality of tape libraries), disk arrays $305_1, \ldots, 305_k$ (where k is any number). Site 31 also includes backup host 306. Similarly, site $31_2$ comprises tape library 310, disk arrays $312_1, \ldots, 312_j$ (where j is any number), and backup host 311. In general, a backup host is the management host for controlling the operation of the backup (e.g., how often and when are backups created, which volumes are in which backup, etc.), and it is the host to be accessed in order to recover a backup.

In this example, multiple hosts $301_1, \ldots, 301_m$ exist for site $31_1$, which are communicatively coupled via one or more communication networks, such as storage area network ("SAN") 303. Further, multiple hosts $308_1, \ldots, 308_p$ exist for site $31_2$, which are communicatively coupled via one or more communication networks, such as SAN 309. Thus, any of hosts $301_1, \ldots, 301_m$ may access the data storage resources 304-306 of site $31_1$ via SAN 303, and any of hosts $308_1, \ldots, 308_p$ may access the data storage resources 310-312 of site $31_2$ via SAN 309. Further, the various sites $31_1$, $31_2, \ldots, 31_n$ are communicatively coupled via wide-area network ("WAN") 33, such as the Internet or other suitable WAN (e.g., one or more dedicated long-haul network links, etc.). Thus, the hosts of a first site (e.g., host $301_1$ of site $31_1$) can access data of the data storage resources of another site (e.g., data storage resources 310-312 of site $31_2$) via WAN 33.

In this exemplary embodiment, inter-position agents are implemented as separate physical entities on the storage area network. In this example, an interposition agent is implemented for each site. For instance, interposition agent 307 is implemented as a separate physical entity on SAN 303 of site $31_1$, and interposition agent 313 is implemented as a separate physical entity on SAN 309 of site $31_2$. As discussed above with FIGS. 1A-1B and 2, interposition agents 307 and 313 are implemented to intercept data access requests made from host processes or site devices.

For example, as illustrated in the example of FIG. 3, a process on host $301_1$ may request access to tape library 304, such as request $R_1$. As shown, such request $R_1$ flows through interposition agent 307, wherein such interposition agent 307 may selectively impact the request if so desired to simulate a fault for tape library 304.

In one embodiment, a separate controller (e.g., controller 206 of FIG. 2) may be provided for each of interposition agents 307 and 313 for controlling their respective actions. In other embodiments, a single controller may be provided, which coordinates the actions of all of the interposition agents involved in a particular campaign. In such an embodiment, each of the interposition agents may have sub-controllers that can receive a sub-campaign from the central controller and implement such sub-campaign. Thus, the central controller may receive campaign information, and then communicate the relevant portions of such campaign as sub-campaigns to the respective sub-controllers of the various interposition agents. Of course, any other suitable implementation may be employed in other embodiments, including for example a decentralized implementation in which the interposition agents exchange information with each other to configure themselves for a desired campaign.

Figure 4:
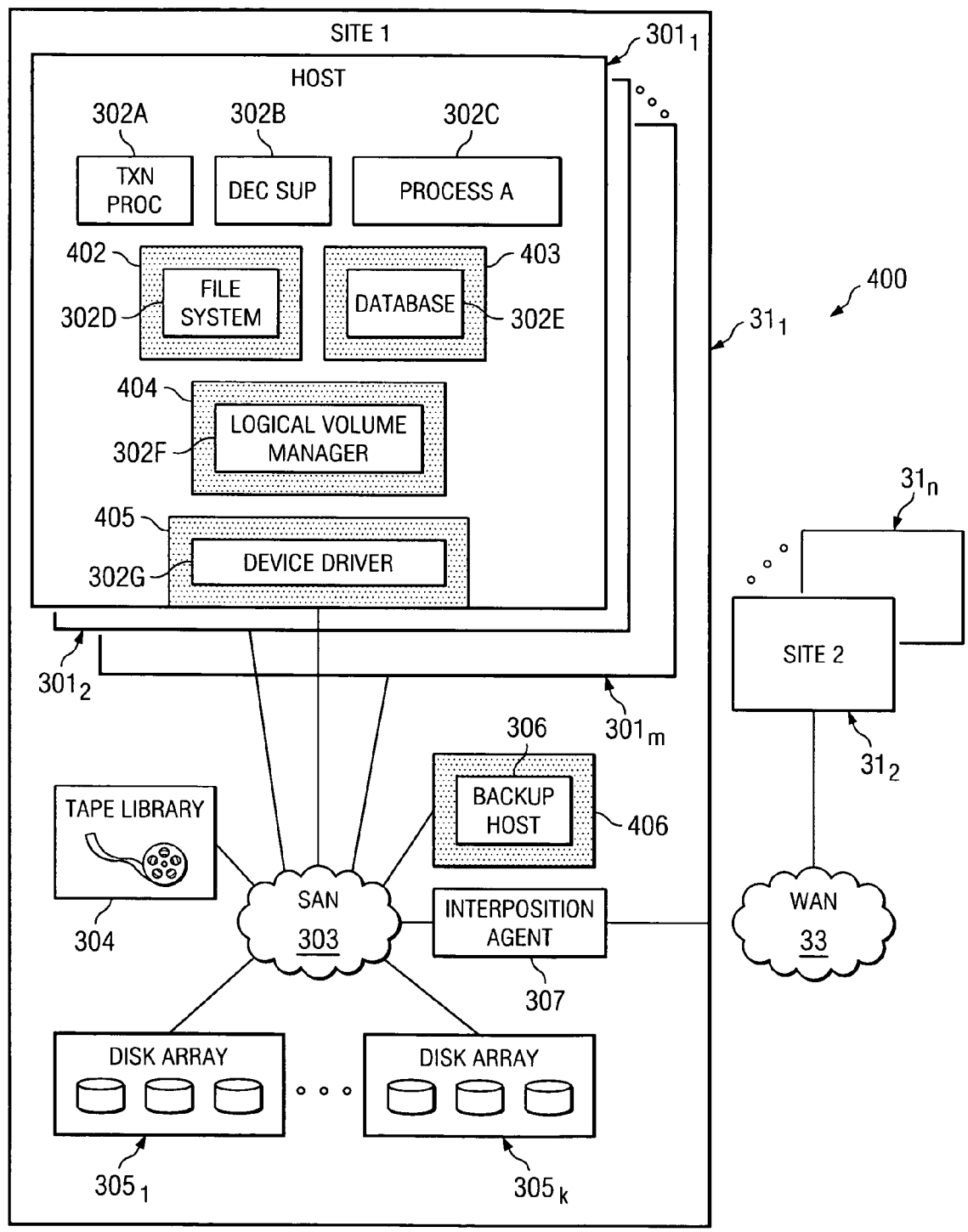
FIG. 4 shows an exemplary system having interposition agents interposed therein according to another embodiment of the present invention.

FIG. 4 shows an exemplary system 400 having interposition agents interposed therein according to another embodiment of the present invention. As described hereafter, system 400 employs host-based interpositioning, as opposed to the site-based interpositioning of FIG. 3. The like parts of system 300 of FIG. 3 are labeled the same in FIG. 4, and for brevity the description of those parts is not repeated for FIG. 4. FIG. 4 includes wrappers 402, 403, 404, and 405 that are wrapped around various portions of the host's software stack. These wrappers include software code for implementing all or a portion of an interposition agent for host $301_1$. Such wrappers may, for example, be implemented to intercept calls made to device driver 302G and potentially simulate a fault for selected requests, in the manner described above.

Oftentimes, tape backups are performed separate from the normal access path for accessing online data, and there is usually a separate host that is responsible for controlling the backup, such as backup host 306 in FIG. 4. Thus, an interposition wrapper 406 may also be included around the backup host 306 for implementing an interposition agent for imposing on data access requests made to/from backup host 306. In one embodiment, all network traffic is intercepted by, for example, a physical device that is interposed between the host and the rest of the world. In another embodiment, network traffic may be intercepted inside the network device driver.

Additionally, interposition agent 307 is also included in this example for imposing, as desired, on traffic between a local disk array (e.g., disk array $305_1$ local to site $31_1$) and a remote disk array (e.g., disk array $312_1$ of site $31_2$, shown in FIG. 3).

Figure 5:
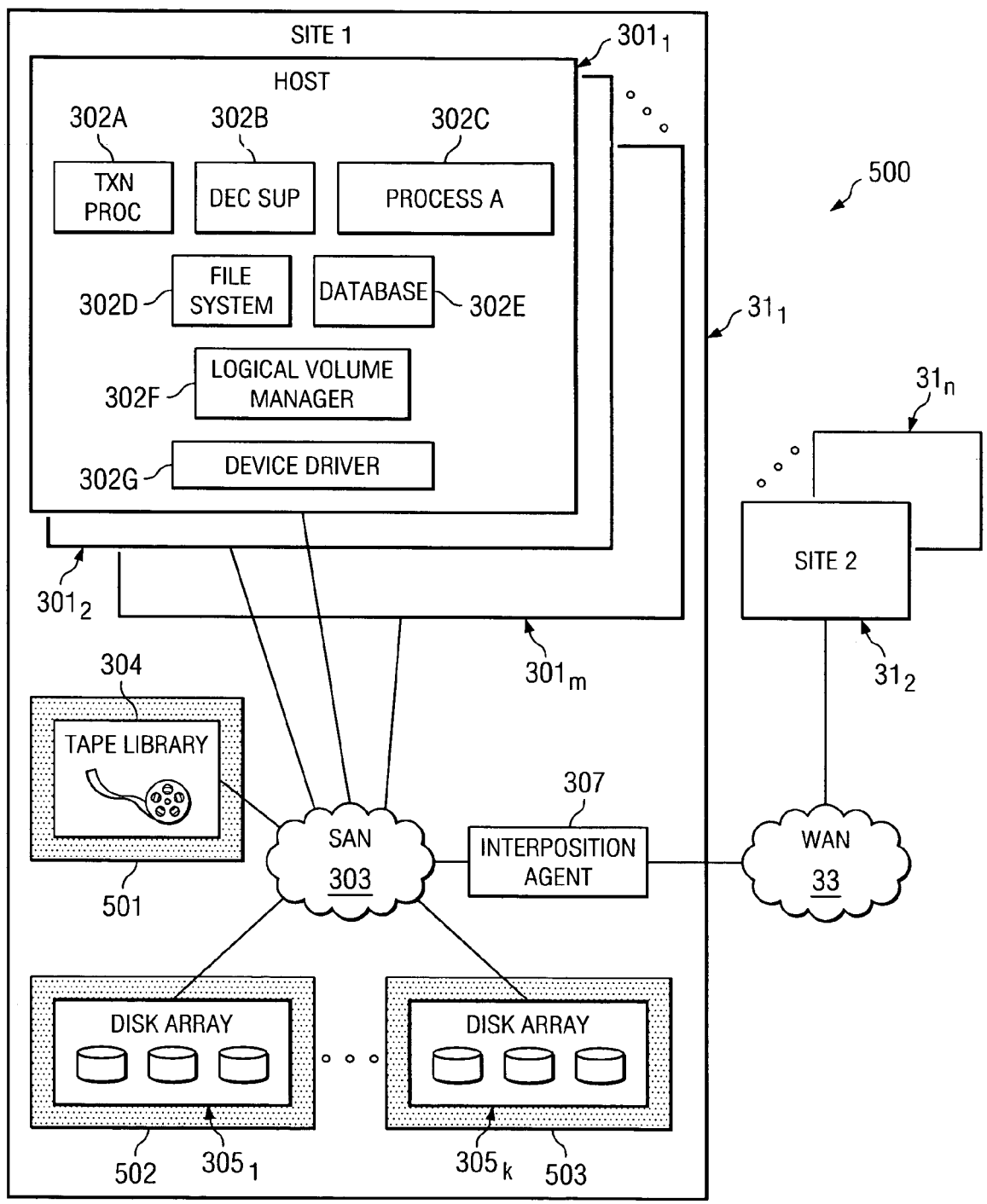
FIG. 5 shows an exemplary system having interposition agents interposed therein according to still another embodiment of the present invention.

FIG. 5 shows an exemplary system 500 having interposition agents interposed therein according to still another embodiment of the present invention. As described hereafter, system 500 employs device-based interpositioning. The like parts of system 300 of FIG. 3 are labeled the same in FIG. 5, and for brevity the description of those parts is not repeated for FIG. 5. FIG. 5 includes interposition agents 501-503 implemented on the storage devices 304, $305_1$, and $305_k$, respectively. Thus, as data access requests are received by any one of the devices, their respective interposition agent intercepts the requests and may potentially simulate a fault of the device for selected requests, in the manner described above. Additionally, interposition agent 307 is also included in this example for imposing, as desired, on traffic between a local disk array (e.g., disk array $305_1$ local to site $31_1$) and a remote disk array (e.g., disk array $312_1$ of site $31_2$, shown in FIG. 3).

FIG. 6 shows an operational flow diagram of one embodiment of the present invention. In operational block 601, an interposition agent intercepts requests for accessing a data storage device. In operational block 602, the interposition agent determines at least one of the requests to impact, and in operational block 603 the interposition agent selectively simulates a fault for the selected request(s).

FIG. 7 shows an operational flow diagram of another embodiment of the present invention. In operational block 701, a controller, such as controller 206 of FIG. 2, determines an error manifestation for a root cause fault desired to be simulated for a data storage device. In block 702, an interposition agent intercepts requests for accessing the data storage device, and in block 703 the interposition agent determines at least one of the intercepted requests to impact with the error manifestation. In block 704, the interposition agent selectively simulates (e.g., via fault simulators, such as simulators 202-205 of FIG. 2) the root cause fault for the determined ones of the intercepted requests to impact by imposing the determined error manifestation on the determined ones of the intercepted requests to impact. In certain embodiments, the controller determines the error manifestation for a root cause fault from a model, such as model 208 of FIG. 2, that maps between root cause faults and respective error manifestations.

Embodiments of the interposition agent, including the controller 206 and/or fault simulators 201 of the exemplary embodiment of FIG. 2, may be implemented in whole or in part as computer-readable software code stored to a computer-readable medium. When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like). Thus, the exemplary operations described above (e.g., the flows of FIGS. 6-7) may be implemented in a system via computer-executable software code. The software code may run on any suitable processor-based system.

In view of the above, according to one embodiment, a method for simulating the injection of failures into a storage system (e.g., block-level storage system) is provided, which is operable to selectively present faulty behavior to some storage clients, while preserving normal (error-free) behavior for other storage clients. Similarly, the method may simulate failure of a portion of the storage system, while preserving normal behavior for the remainder of the storage system. Such embodiment is based on interposing between the layers of the storage system to simulate fault manifestations of the storage service. The method contains a model for translating root cause faults induced by hardware and software problems and human mistakes into the application-visible error manifestations. The method can be applied at the interface for different data protection techniques (e.g., snapshots, backup, remote replication).

The interposition framework of certain embodiments of the present invention can be used to simulate a fault of a storage subsystem by providing wrong (or no) answers or slowed performance for that service. It is less straightforward to simulate failures in the opposite direction—that is, to the inputs of the service, including user or administrator mistakes, configuration errors, malicious attacks, or failures of the software comprising the client of the service. The key difference with these incoming requests is that they require the ability to change the persistent state of the underlying service to reflect the failed request. A change in persistent state is problematic if other applications that are not under test share the storage service. Thus, the correct operation of the service requires the ability to isolate the state changes induced by these injected failures.

If the application under test is running in a standalone mode (e.g., there are no concurrent applications not under test), isolating the injected errors can be achieved by merely rolling back the persistent state to the point before errors were injected (e.g., through the use of storage system point-in-time copies, file system snapshots or database checkpoints). This method can be used to reset the state to a consistent point before each injection experiment.

In a shared environment, with concurrently executed, non-tested applications, we need the ability to create a "shadow" copy of the state, to permit operation by the fault injection infrastructure, while allowing the unaffected workloads to operate on the unmodified state. Nagaraja, et al., describe a method of partitioning physical resources to isolate testing of administrator actions, see "Understanding and dealing with operator mistakes in internet services," In *Proc. OSDI*, December, 2004. Virtual machine techniques could also be employed, possibly using copy-on-write techniques to make space-efficient copies of modified persistent state.

Given the desire to use fault injection to support testing of application behavior under faults, another use for interpositioning agents is to collect and replay traces of known fault input loads. For example, the agent could capture a log of inputs that caused a problem, which could then be replayed to re-evaluate whether a proposed configuration change fixed the problem.

Interpositioning to impose simulated storage failures can be applied between different layers of the storage stack. For instance, a virtual file system wrapper can be used to simulate failures in a network file system or a database wrapper can be used to simulate database failure in a multi-tier environment.

The classes of fault manifestations may be extended to incorporate manifestations of malicious attacks (e.g., denial of service attacks, undetected modification or deletion of data) or configuration errors, which may lead to degraded performance or incorrect behavior. Additionally, the manifestations could be adapted to incorporate longer-term storage concerns, such as bit rot or storage format obsolescence.

Certain embodiments of the present invention provide for injecting simulated failures of a storage subsystem by providing wrong (or no) answers or slowed performance for that service. Faults to the inputs of the service, including user or administrator mistakes or failures of the software comprising the client of the service, may be simulated. These incoming requests require the ability to change the persistent state of the underlying service to reflect the faulty request.

In addition to simulating faults, interpositioning may be used to insert real faults (or, at least some classes of real faults) into the storage system. For example, one may use this approach (e.g., via the interposition agent) to flip some bits while writing, thus injecting persistent data corruption into the underlying storage system. This action would impact all applications accessing the faulty portion of the storage system.

In certain embodiments, the interposition agent may choose to modify accessed data and pass the modified data on to a requestor (e.g., a requesting application). In other embodiments, the interposition agent maintains two copies of the data (e.g., by means of a copy-on-write variant of the underlying "true" version), and to pass through correct data to the "true version" but modify (e.g., corrupt) the copy sent to the shadow copy if it comes from a targeted application or system. Only applications that are being affected by the fault would be given access to the modified shadow copy, while others are provided the correct copy of the data.

Interpositioning may also be used to simulate network faults for selected clients in addition to or instead of storage system faults. Exemplary network faults include slowdown of message transmission, packet loss, and corruption of packet headers or payload.

Certain embodiments of the present invention may also be used to collect and replay traces of known fault input loads, to support testing of application behavior under faults. For instance, in certain embodiments the interposition agent captures a log of inputs that caused a problem, which can then be replayed to re-evaluate whether a proposed configuration change fixed the problem.

According to embodiments of the present invention, the above-described interpositioning-based storage fault simulation may be used for a variety of different purposes, including as examples:

a) understanding storage client responses to faults: for instance, an understanding of whether, under simulated storage faults, the client (e.g., application) behaves differently than under normal (fault-free) operation, and/or whether the client behaves differently under different simulated faults;

b) testing storage client functionality: for instance, determining the minimal fault vector to test the storage client's functionality and error-handling (e.g., for application regression testing);

c) tuning application behavior: a loop to tune application behavior, based on observed response to simulated storage fault (e.g., the most commonly occurring faults or those that provoke the most severe reaction). For instance, such a loop may be used for determining how the application can be configured to be more tolerant of certain types/severities/frequencies of faults. Alternately, the evaluation can analyze whether the application can automatically adapt its behavior to be more tolerant, based on observed fault behavior (e.g., by adjusting its data layout after a certain threshold of errors has been reached);

d) understanding worst-case behavior: determining what is the worst behavior an application exhibits in response to certain classes of storage faults, and what are the storage faults that provoke this behavior;

e) continual, proactive application testing: one may continually inject faults into a running application, to test its ability to tolerate (e.g., mask or recover from) faults. One can think of this as a "rapid aging testing" scheme, which attempts to reduce the time needed to observe the application response to faults that might take a long time to occur under natural circumstances (e.g., 10 years for bit rot in an archival system). One may inject faults into the production version of the application, or one might create a copy of the production workload and selectively inject faults into one copy, while the other copy continues to operate in fault-free mode;

f) tuning storage system design: different storage system configurations (e.g., different data layouts or the placement of an application at site 1 vs. site 2) might possess different fault patterns. If one could characterize these fault signatures, one could use the fault signatures to drive several fault injection campaigns (one for each candidate configuration) to emulate the behavior of different storage configurations, and use this information to pick the best configuration for the workload; and g) using measurements of recovery behavior to calibrate analytical models used for automated storage system design. For example, analytic models of recovery time and data loss under recovery may be used to pick the best storage system to protect a workload's data (e.g., determine whether a backup or a remote mirror should be used). A storage fault injection system could be used to gather measurements of these recovery behaviors, to calibrate or refine these analytical recovery models.

Embodiments of the present invention may be used in any of these and/or other applications in which fault injection may be desired.

What is claimed is:

1. A method comprising:

intercepting, at an interposition agent, requests for accessing a data storage device;

selecting, by said interposition agent, at least one of said requests to impact;

selectively simulating, by said interposition agent, a fault for the selected at least one of said requests; and determining, by said interposition agent, an action to take for simulating said fault for the selected at least one of said requests, wherein said determining comprises using, by said interposition agent, a model to determine said action to take for simulating said fault, where said model maps a plurality of different faults to respective manifestations.

2. The method of claim 1 wherein the simulated fault comprises at least one of the following:

SCSI timeout, power failure, firmware bug, intermittent offline period, cache failure, cache contention, disk array mirrored controller failure, malicious data corruption, malicious data deletion, accidental data corruption, accidental data deletion, snapshot system out of space, snapshot retention period expiration, failure of backup creation process, malicious backup deletion, accidental backup deletion, backup takes longer than allotted window of time, failure of tape media, failure of drive, backup process misconfiguration, failure of network link, out of space, logical volume misconfiguration, file system misconfiguration, file system aging, malicious file system data corruption, malicious file system data deletion, accidental file system data corruption, accidental file system data deletion, malicious file system metadata corruption, malicious file system metadata deletion, accidental file system metadata corruption, accidental file system metadata deletion, database management system server overload, storage system misconfiguration, malicious database management system data corruption, malicious database management system data deletion, accidental database management system data corruption, accidental database management system data deletion, malicious database management system log corruption, malicious database management system log deletion, accidental database management system log corruption, accidental database management system log deletion, malicious database management system catalog corruption, malicious database management system catalog deletion, accidental database management system catalog corruption, and accidental database management system catalog deletion.

3. The method of claim 2 wherein said selectively simulating comprises simulating at least one of the following manifestations of said simulated fault:

request failure, request slowdown, read slowdown, write slowdown, read returns incorrect results, snapshot creation failure, snapshot restore failure, recovery request failure, backup creation request failure, write failure, write records incorrect data, write records correct data to incorrect location, logical volume creation failure, logical volume modification failure, and logical volume deletion failure.

4. The method of claim 1 wherein said selectively simulating comprises simulating a manifestation of said simulated fault.

5. The method of claim 4 further comprising:

determining from the model said manifestation to simulate for said simulated fault.

6. The method of claim 4 wherein said simulating said manifestation comprises simulating at least one of the following:

delayed response, no response, return corrupt data, loss of at least a portion of requested data, and returned error.

7. The method of claim 1 further comprising:

implementing the interposition agent communicatively interposed between an operating system layer and storage device layer.

8. The method of claim 1 wherein the data storage device comprises at least one selected from the group consisting of: disk drive, disk array device, tape device, remote storage device, backup storage system, file system, database, and persistent non-volatile memory.

9. The method of claim 1 further comprising:
receiving campaign information by said interposition agent.

10. The method of claim 9 where said campaign information specifies at least one of the following: type of said fault desired to be simulated, identification of the selected at least one of said requests for which said fault is to be simulated, frequency of said fault to be injected, duration of said fault, and scope of said fault to be simulated.

11. The method of claim 1 further comprising:
selectively passing to said data storage device, by said interposition agent, ones of said requests that are not determined as requests to impact.

12. The method of claim 1 further comprising:
selectively not impacting certain ones of said requests by said interposition agent.

13. The method of claim 1 further comprising:
implementing said interposition agent communicatively interposed between at least one requestor making said requests and said data storage device.

14. The method of claim 13 wherein said implementing comprises:
implementing said interposition agent transparent to said at least one requestor.

15. The method of claim 14 further comprising:
implementing said interposition agent transparent to said data storage device.

16. The method of claim 1 further comprising:
evaluating behavior of at least one requestor making said selected at least one of said requests for which said fault is simulated.

17. The method of claim 1 further comprising using said selectively simulated fault for at least one of the following:
a) understanding response of a requestor to said fault, b) testing functionality of said requestor, c) tuning behavior of said requestor, d) understanding worst-case behavior of said requester, e) continual, proactive testing of said requester, f) tuning storage system design, and g) using measurements of recovery behavior to calibrate analytical models used for automated storage system design.

18. The method of claim 1, wherein said model maps multiple ones of said plurality of different faults to one of the manifestations.

19. A method comprising:
intercepting, at an interposition agent, requests for accessing a data storage device;
determining, by said interposition agent, at least one of said requests to impact;
selectively simulating, by said interposition agent, a fault for the selected at least one of said requests; and
said interposition agent maintaining an unmodified copy of requested data and a modified copy of said requested data.

20. The method of claim 19 wherein said selectively simulating said fault further comprises:
returning, by said interposition agent, said modified copy of said requested data for the selected at least one of said requests.

21. The method of claim 20 wherein said selectively simulating said fault further comprises:
returning, by said interposition agent, said unmodified copy of said requested data for requests that are not to be impacted.

22. A method comprising:
determining by a controller, from a model, an error manifestation for a particular root cause fault desired to be simulated for a data storage device, wherein the model is to map plural root cause faults to corresponding error manifestations;
intercepting, by an interposition agent, requests for accessing said data storage device;
determining, by said interposition agent, at least one of the intercepted requests to impact with said error manifestation for the particular root cause fault; and
selectively simulating, by said interposition agent, said particular root cause fault for the determined at least one of the intercepted requests to impact by imposing said determined error manifestation on the determined at least one of the intercepted requests to impact.

23. The method of claim 22 further comprising:
receiving information at said controller specifying said particular root cause fault desired.

24. The method of claim 22 further comprising:
receiving information at said interposition agent specifying said at least one request to impact.

25. The method of claim 22 further comprising:
receiving campaign information at said controller.

26. The method of claim 25 wherein said campaign information specifies at least one of the following: type of said root cause fault desired to be simulated, identification of the requests to impact, frequency of said root cause fault to be injected, duration of said root cause fault, and scope of said root cause fault to be simulated.

27. A system comprising:
at least one data storage device;
at least one requestor operable to request access to said at least one data storage device; and
at least one interposition agent communicatively interposed between said at least one requestor and said at least one data storage device to intercept requests for access from said at least one requestor to said at least one data storage device, wherein said interposition agent is operable to selectively determine at least one of said intercepted requests to impact and selectively simulate a fault for the selected at least one of said requests, and wherein the interposition agent is to maintain an unmodified copy of requested data and a modified copy of the requested data.

28. The system of claim 27 wherein said at least one interposition agent is transparent to said at least one requestor.

29. The system of claim 27 wherein said at least one interposition agent is transparent to said at least one data storage device.

30. The system of claim 27 wherein said at least one interposition agent is communicatively interposed between an operating system and said at least one data storage device.

31. The system of claim 27 wherein said at least one interposition agent is operable to selectively simulate said fault by simulating at least one manifestation of said fault.

32. The system of claim 27 further comprising:
at least one controller operable to determine an error manifestation for said fault.

33. The system of claim 32 wherein said at least one controller is integrated within said at least one interposition agent.

34. The system of claim 27 wherein the interposition agent simulates the fault for the selected at least one request by returning the modified copy of the requested data.

35. The system of claim 34, wherein the interposition agent is to return the unmodified copy of the requested data for a request that is not to be impacted.

36. An interposition agent executable by a processor-based system and communicatively interposed between at least one requestor and a data storage device to intercept requests for access from said at least one requestor to said data storage device, said interposition agent comprising:
   means for determining at least one of the intercepted requests to impact, wherein not all of said intercepted requests are to be impacted; and
   means for selectively simulating a fault for the determined at least one of the intercepted requests to impact, wherein simulating the fault includes imposing an error manifestation on the determined at least one of the intercepted requests to impact, wherein the imposed error manifestation is determined from a model that maps plural faults to corresponding error manifestations.

37. The interposition agent of claim 36 further comprising:
   means for receiving an indication of a fault desired to be simulated.

38. The interposition agent of claim 36 further comprising:
   means for receiving an indication of the at least one of intercepted requests desired to be impacted.

39. An interposition agent executable by a processor-based system and communicatively interposed between at least one requestor and at least one data storage device to intercept requests for access from said at least one requestor to said at least one data storage device, said interposition agent comprising:
   controller operable to use a model to determine an error manifestation for a specified root cause fault for said at least one data storage device, wherein said model maps a plurality of different root cause faults to respective manifestations; and
   simulator operable to simulate said determined error manifestation for said at least one data storage device for requests.

40. The interposition agent of claim 39 wherein said interposition agent is transparent to said at least one requester.

41. The interposition agent of claim 40 wherein said interposition agent is transparent to said at least one data storage device.

42. The interposition agent of claim 39 wherein said interposition agent is communicatively interposed between an operating system and said at least one data storage device.

43. Computer-executable software code stored to a computer-readable storage media, said computer-executable software code executable in a processor-based system and comprising:
   code for determining from a model an error manifestation for a particular root cause fault desired for a data storage device, wherein said model maps a plurality of different root cause faults to respective manifestations;
   code for receiving intercepted requests for accessing a data storage device;
   code for determining at least one of said intercepted requests to impact with said determined error manifestation; and
   code for selectively simulating said particular root cause fault for the determined at least one of said intercepted requests by imposing said determined error manifestation on the determined at least one of said intercepted requests.

44. The computer-executable software code of claim 43 further comprising:
   code for receiving information specifying said particular root cause fault desired.

45. The computer-executable software code of claim 43 further comprising:
   code for receiving information specifying said requests to impact.

* * * * *

UNITED STATES PATENT AND TRADEMARK OFFICE
CERTIFICATE OF CORRECTION

| | |
|---|---|
| PATENT NO. | : 7,467,333 B2 |
| APPLICATION NO. | : 11/218235 |
| DATED | : December 16, 2008 |
| INVENTOR(S) | : Kimberly Keeton et al. |

It is certified that error appears in the above-identified patent and that said Letters Patent is hereby corrected as shown below:

In column 22, line 11, in Claim 22, delete "device:" and insert -- device; --, therefor.

Signed and Sealed this

Sixteenth Day of March, 2010

David J. Kappos
*Director of the United States Patent and Trademark Office*